March 23, 1937.  R. A. GOEPFRICH  2,074,725
BRAKE
Filed Dec. 6, 1935   3 Sheets-Sheet 1

INVENTOR.
RUDOLPH A. GOEPFRICH
BY
ATTORNEY

March 23, 1937.   R. A. GOEPFRICH   2,074,725
BRAKE
Filed Dec. 6, 1935   3 Sheets-Sheet 2

INVENTOR.
RUDOLPH A. GOEPFRICH
BY
*M. W. McCowley*
ATTORNEY

March 23, 1937.　　R. A. GOEPFRICH　　2,074,725
BRAKE
Filed Dec. 6, 1935　　3 Sheets-Sheet 3

INVENTOR.
RUDOLPH A. GOEPFRICH
BY
ATTORNEY

Patented Mar. 23, 1937

2,074,725

UNITED STATES PATENT OFFICE 2,074,725

BRAKE

Rudolph A. Goepfrich, South Bend, Ind., assignor to Bendix Products Corporation, South Bend, Ind., a corporation of Indiana Application December 6, 1935, Serial No. 53,192

14 Claims. (Cl. 188—106)

This invention relates to brakes, and is illustrated as embodied in internal expanding automobile brakes of the shiftable anchorage type.

An object of the invention is to provide simple operating mechanism including two completely independent brake operators, for actuation respectively by the service pedal and the emergency brake lever or their equivalents.

In one desirable arrangement of parts, there are two levers which are operable independently of each other and both of which are preferably housed inside of the brake, and which both act on the ends of the friction means. I prefer to arrange these levers on opposite sides of the brake anchor, and to actuate them by means including flexible tension elements such as cables extending through the backing plate into the brake. Various features of novelty relate to the arrangement of the levers and the actuating means for them.

The above and other objects and features of the invention, including various novel combinations of parts and desirable particular constructions, will be apparent from the following description of the illustrative embodiments shown in the accompanying drawings, in which.

Figure 1:
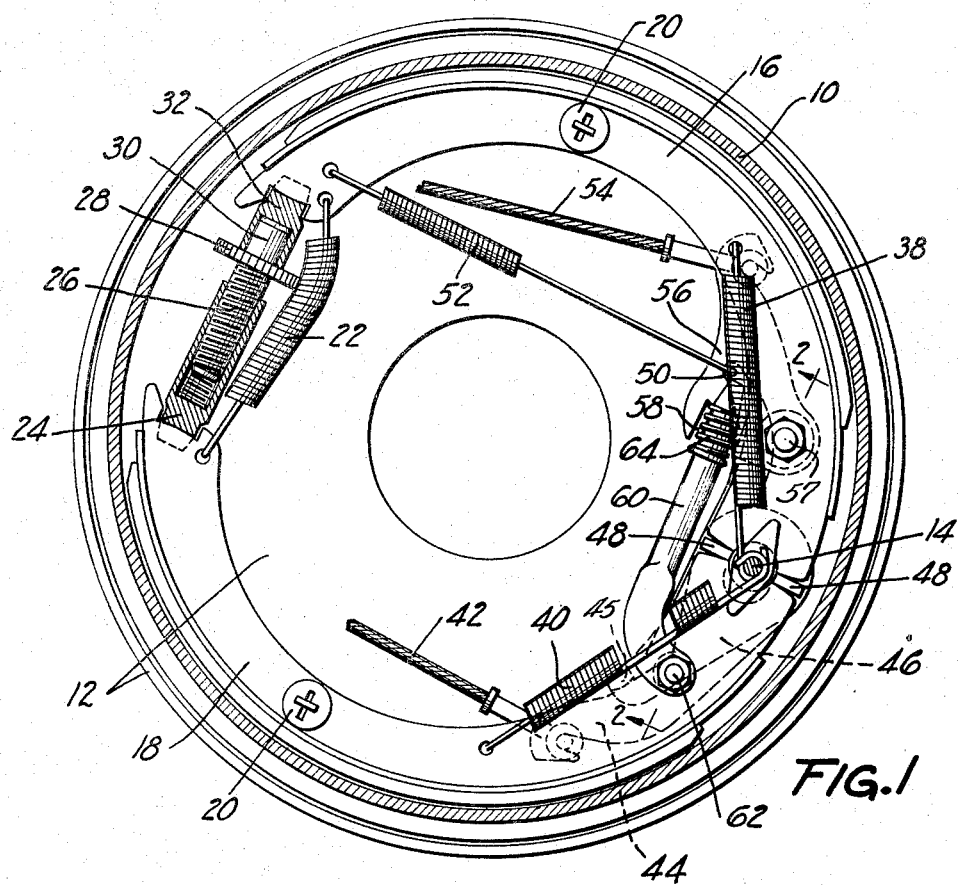
Figure 1 is a vertical section through one embodiment, just inside the head of the brake drum, and showing the brake friction means in side elevation.

The brakes illustrated in the drawings each comprises a rotatable drum 10, at the open side of which is a support such as a backing plate 12 preferably formed and arranged to cooperate with the drum 10 to provide a substantially closed brake chamber housing the movable parts described below. The backing plate is shown as carrying an anchor pin 14, or equivalent anchorage means, for the separable ends of the brake friction means.

The brake friction means includes a pair of brake shoes 16 and 18, provided with steady rests 20, and held at one side of the brake (opposite the anchor 14) by means such as a spring 22 against the notched ends of an adjusting device.

Figure 3:
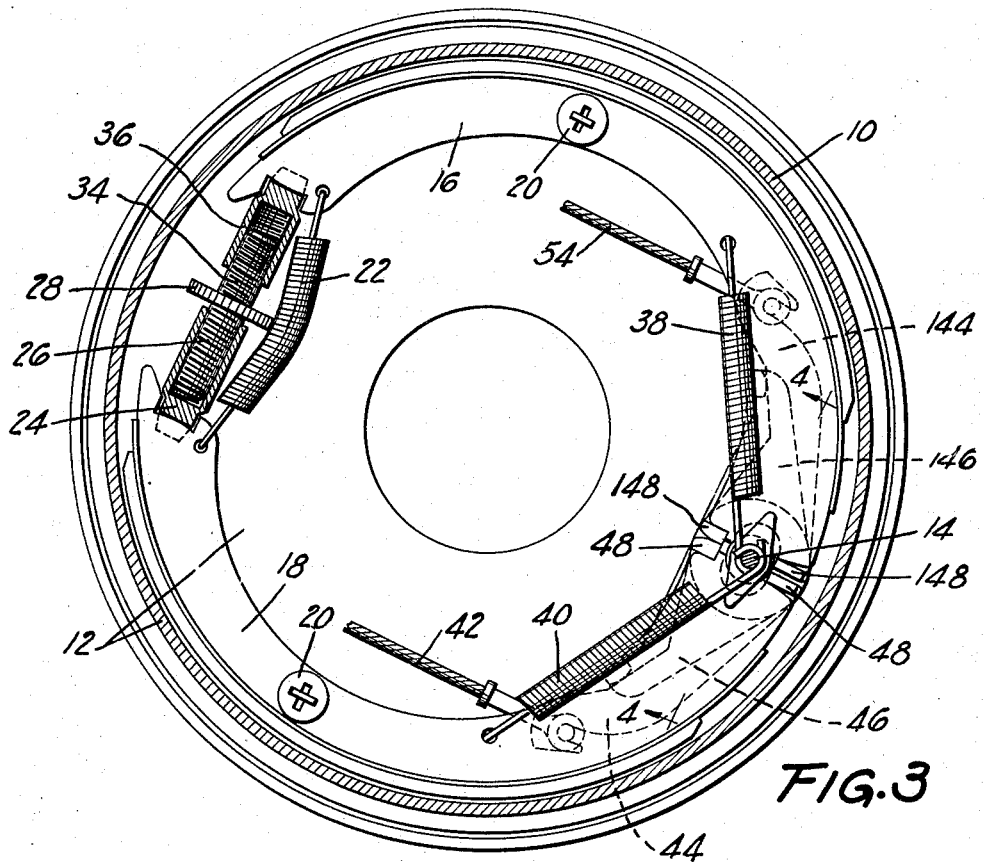
Figure 3 is a section corresponding to Figure 1, but showing a different modification.

The adjusting device of Figure 1 includes a socket 24 engaging shoe 18 and threadedly receiving a threaded stem 26 carried by a serrated collar or starwheel 28 which has on its opposite side an unthreaded stem 30 rotatably seated in a socket 32 engaging the shoe 16. The starwheel 28 is accessible through an opening in the backing plate 12. In Figure 3 the starwheel 28 has, in place of the unthreaded stem 30, a stem 34 threaded into an upper socket 36, the threads on stems 26 and 34 being of different pitch.

The shoes are urged into released position, in engagement with anchor 14, by means such as return springs 38 and 40 tensioned between the anchor 14 and the shoes respectively. One of these springs, i. e. the one connected to the shoe which is anchored in forward braking, may be heavier than the other.

The present invention relates mainly to means for applying a brake of this general character, whether or not it is of the exact construction described above.

Figure 2:
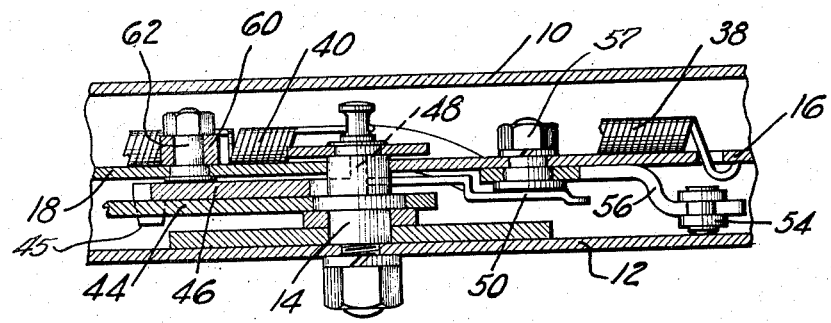
Figure 2 is a partial section on the line 2—2 of Figure 1.

In the arrangement illustrated in Figures 1 and 2, the service pedal connections or their equivalent are arranged to apply tension to a flexible tension element such as a cable 42. This cable may, if desired, form part of a Bowden-type control, passing through a flexible conduit (not shown) attached at its end to the backing plate 12 and thence through the backing plate at the lower part of the brake into the brake chamber within the drum 10.

The cable 42 is shown connected to the end of an operating lever 44, movable in a plane paralleling the backing plate, in the space between the backing plate and the shoe 18, and which at its upper end is pivotally fulcrumed on the anchor 14. The edge of the lever 44 is in thrust engagement with a laterally-projecting lug 45 forming part of a floating lever 46 arranged beside the lever 44 and between that lever and the shoe 18.

The upper end of lever 46 is notched slidably to embrace the anchor 14, to position the lever radially of the brake without interfering with its floating movement circumferentially of the brake. On opposite sides of the anchor 14 the lever 46 is formed with thrust lugs 48 between the ends of the shoes 16 and 18, and which act on those shoes respectively in applying the brake. It will be understood that levers 44 and 46 may be so formed and so arranged that the force from cable 42 applied to the shoes 16 and 18 is substantially equal no matter which shoe is anchored.

The lever 44 may have rigidly welded thereto an extension 50 connected to a return spring 52 attached at its other end to the shoe 16 or, if preferred, to the backing plate.

A second cable 54 (which may also form part of a Bowden-type control), actuated by the emergency lever or its equivalent, extends through the backing plate 12 into the brake chamber, at the upper part of the brake, being attached to the end of a third lever 56, connected to the shoe 16 by a floating pivot 57 on the opposite side of the anchor 14 from levers 44 and 46, to float with the shoe, and being movable in a plane paralleling the backing plate and between the backing plate and the shoe 16. This lever is formed with a recess 58 for the end of a thrust link 60.

The link 60 is connected at its lower end to the shoe 18, by means such as a pivot 62, and is notched at its upper end to embrace the lever 56. A spring 64 may be sleeved on the link 60 and held compressed between a collar on that link, and the lever 56, to prevent rattles.

It will be seen that depression of the service pedal acts through the cable 42 to rock the lever 44, which in turn actuates the lever 46 to apply the brake. Operation of the emergency lever acts through cable 54 to rock the lever 56 to apply the brake, entirely independently of the levers 44 and 46.

Figure 4:
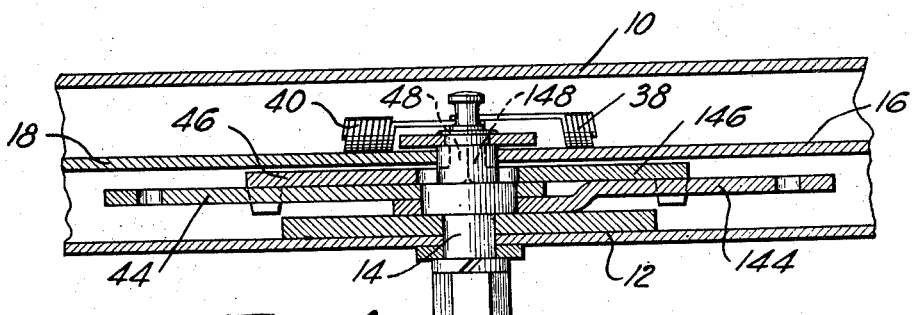
Figure 4 is a partial section on the line 4—4 of Figure 3.

In Figures 3 and 4, the cable 42 or its equivalent is connected, as before, to a lever 44 which in turn actuates lever 46 to apply the brake. The cable 54, however, is arranged to actuate a lever 144 pivoted on the anchor 14 and in thrust engagement with a floating lever 146 having shoe-actuating lugs 148. The levers 144 and 146 are substantially the same as the levers 44 and 46, except that they are arranged above instead of below the anchor 14.

The lugs 48 and 148 are shown in engagement, so that the stationary lug 48 or 148 (as the case may be) on which the lever 46 or 146 fulcrums in applying the brake, actually rocks against the other lug instead of directly on the anchored shoe, but this does not change the method of operation. If desired, one lug of each of the sets 48—148 may be bent back to form a hook embracing the end of the shoe, to aid in positioning the levers 144 and 146 relatively to the shoes.

Figure 5:
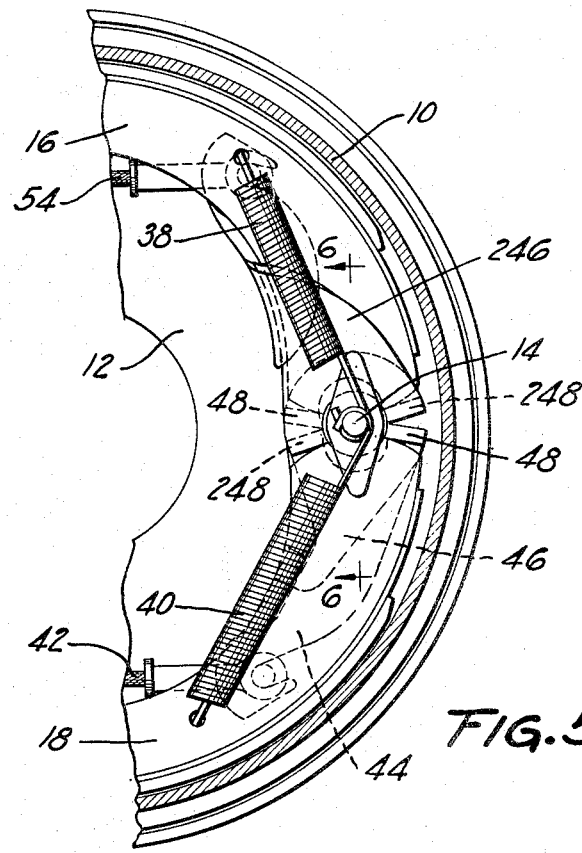
Figure 5 is a partial section corresponding to the right-hand portion of Figures 1 and 3, but showing a third modification.
Figure 6:
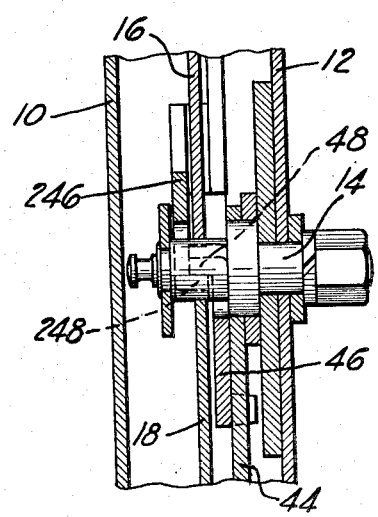
Figure 6 is a partial section on the line 6—6 of Figure 5.

In Figures 5 and 6, the cable 54 is directly connected to a floating lever 246. The connection is in the space between the shoe 16 and the backing plate 12, but the lever 246 is bent around the web of shoe 16 so that its body portion is on the opposite side of shoe 16 from the backing plate, and its thrust lugs 248 project toward the backing plate instead of away from it as in Figure 3.

While several illustrative embodiments have been described in detail, it is not my intention to limit the scope of the invention to those particular embodiments, or otherwise than by the terms of the appended claims.

I claim:

1. A shiftable-anchorage brake comprising a backing plate having mounted thereon friction means having separable ends and carrying an anchorage adjacent said ends and taking the torque of said friction means, two floating levers acting independently of each other on said ends and both of which are mounted to shift with said ends when one or the other of them anchors on said anchorage, one of said levers being arranged in the space between the backing plate and the friction means above the anchorage and the other being arranged in the space between the backing plate and the friction means below the anchorage, means at the upper part of the brake for rocking said one of said levers to apply the brake, and means at the lower part of the brake for rocking said other of said levers to apply the brake.

2. A brake comprising friction means having separable ends, two floating levers acting independently of each other on said ends and both of which are mounted to shift with said ends, means at the upper part of the brake for rocking one of said levers to apply the brake, and means at the lower part of the brake for rocking the other of said levers to apply the brake, one of said levers being pivotally mounted on one of said ends and the means for applying said one lever including a flexible tension element connected thereto and extending outside the brake.

3. A shiftable-anchorage brake comprising friction means having separable ends and an anchorage adjacent thereto, two floating levers acting independently of each other on said ends and both of which are mounted to shift with said ends when one or the other of them anchors on said anchorage, means at the upper part of the brake for rocking one of said levers to apply the brake, and means at the lower part of the brake for rocking the other of said levers to apply the brake, one of said means including a third lever mounted on the anchorage and engaging the corresponding one of said first two levers together with a flexible tension element connected to the third lever and extending to the exterior of the brake.

4. A shiftable-anchorage brake comprising friction means having separable ends and an anchorage adjacent thereto, two floating levers acting independently of each other on said ends and both of which are mounted to shift with said ends when one or the other of them anchors on said anchorage, means at the upper part of the brake for rocking one of said levers to apply the brake, and means at the lower part of the brake for rocking the other of said levers to apply the brake, one of said means including a third lever mounted on the anchorage and engaging the corresponding one of said first two levers.

5. A shiftable-anchorage brake comprising friction means having separable ends and an anchorage adjacent thereto, two floating levers acting independently of each other on said ends and both of which are mounted to shift with said ends when one or the other of them anchors on said anchorage, means at the upper part of the brake for rocking one of said levers to apply the brake, and means at the lower part of the brake for rocking the other of said levers to apply the brake, one of said means including a third lever mounted on the anchorage and engaging the corresponding one of said first two levers together with a flexible tension element connected to the third lever and extending to the exterior of the brake, the other of said first two levers being mounted on one of said ends and having a second flexible tension element connected thereto and extending to the exterior of the brake.

6. A shiftable-anchorage brake comprising friction means having separable ends and an anchorage adjacent thereto, two floating levers acting independently of each other on said ends and both of which are mounted to shift with said ends when one or the other of them anchors on said anchorage, means at the upper part of the brake for rocking one of said levers to apply the brake, and means at the lower part of the brake for rocking the other of said levers to apply the brake, one of said means including a third lever mounted on the anchorage and engaging the corresponding one of said first two levers, the other of the first two levers having a flexible tension element connected thereto and extending to the exterior of the brake.

7. A brake comprising a backing plate carrying an anchor, friction means having separable ends between which said anchor is arranged, a first lever pivotally mounted on one of said ends and arranged in the space between the friction means adjacent said end and the backing plate and having a thrust connection extending past said anchor and acting on the other of said ends, a second lever arranged between the backing plate and the friction means adjacent the other of said ends and having thrust parts engaging both of said ends, a third lever pivoted on the anchor and arranged beside and engaging said second lever, and two flexible tension elements extending through the backing plate and connected respectively to the first and third levers.

8. A brake comprising a backing plate carrying an anchor, friction means having separable ends between which said anchor is arranged, a first lever pivotally acting on one of said ends and having a thrust connection extending past said anchor and acting on the other of said ends, a second lever on the opposite side of the anchor from the first lever and having thrust parts engaging both of said ends, a third lever pivoted on the anchor and arranged beside and engaging said second lever, and two flexible tension elements extending through the backing plate and connected respectively to the first and third levers.

9. A brake comprising a backing plate carrying an anchor, friction means having separable ends arranged with the anchor between them, a pair of levers on opposite sides of the anchor and each arranged between the backing plate and the corresponding end portion of the friction means and each of which is formed to float circumferentially of the brake relatively to the anchor and each of which is provided with thrust lugs extending between the ends of the friction means respectively inside and outside the anchor, a corresponding pair of operating levers pivoted on the anchor and arranged respectively beside and in thrust engagement with the first levers, and operating devices for the operating levers respectively.

10. A brake comprising a backing plate carrying an anchor, friction means having separable ends arranged with the anchor between them, a pair of levers on opposite sides of the anchor and each of which is formed to float circumferentially of the brake relatively to the anchor and each of which is provided with thrust lugs extending between the ends of the friction means respectively inside and outside the anchor, a corresponding pair of operating levers arranged respectively beside and in thrust engagement with the first levers, and operating devices for the operating levers respectively.

11. A brake comprising a backing plate carrying an anchor, friction means having separable ends with said anchor arranged between them, a first lever arranged between the backing plate and friction means on one side of the anchor and provided with thrust means acting on said ends, a second lever arranged on the opposite side of the friction means from the backing plate and on the opposite side of the anchor from the first lever and which has thrust means acting on said ends, and operating means acting independently on said two levers.

12. A brake comprising a backing plate carrying an anchor, friction means having separable ends with said anchor arranged between them, a first lever arranged between the backing plate and friction means and provided with thrust means acting on said ends, a second lever arranged on the opposite side of the friction means from the backing plate and which has thrust means acting on said ends, and operating means acting independently on said two levers.

13. A brake comprising a backing plate carrying an anchor, friction means having separable ends with said anchor arranged between them, a first lever arranged between the backing plate and friction means on one side of the anchor and provided with thrust means acting on said ends, a second lever arranged on the opposite side of the friction means from the backing plate and on the opposite side of the anchor from the first lever and which has thrust means acting on said ends, and operating means acting independently on said two levers, said second lever passing around the friction means into the space between the backing plate and the friction means, and said operating means including parts engaging the two levers between the backing plate and friction means and movable in a plane paralleling the backing plate.

14. A brake comprising a backing plate carrying an anchor, friction means having separable ends with said anchor arranged between them, a first lever arranged between the backing plate and friction means and provided with thrust means acting on said ends, a second lever arranged on the opposite side of the friction means from the backing plate and which has thrust means acting on said ends, and operating means acting independently on said two levers, said operating means including parts engaging the two levers and movable in a plane paralleling the backing plate and one of which is a flexible tension element directly connected to its lever and the other of which is a third lever pivoted on the anchor and arranged beside and in thrust engagement with the other of the two levers.

RUDOLPH A. GOEPFRICH.